US009262491B2

(12) United States Patent
Nambiar et al.

(10) Patent No.: US 9,262,491 B2
(45) Date of Patent: Feb. 16, 2016

(54) SYSTEM AND METHOD FOR IMPLEMENTING MULTI-TEMPORAL DATABASE FUNCTIONALITY

(75) Inventors: Ullas Balan Nambiar, Haryana (IN); Prasad Manikarao Deshpande, Mumbai (IN); Ramanujam Seshadri Halasipuram, Bangalore (IN); Balakrishna Raghavendra Iyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 13/172,498

(22) Filed: Jun. 29, 2011

(65) Prior Publication Data

US 2013/0007067 A1    Jan. 3, 2013

(51) Int. Cl.
*G06F 7/00* (2006.01)
*G06F 17/30* (2006.01)

(52) U.S. Cl.
CPC ................................ *G06F 17/30557* (2013.01)

(58) Field of Classification Search
USPC .................................................. 707/803, 746
See application file for complete search history.

(56) References Cited

U.S. PATENT DOCUMENTS

| 7,734,659 | B2 * | 6/2010 | Lori | 707/802 |
| 2007/0050429 | A1 * | 3/2007 | Goldring et al. | 707/203 |
| 2009/0248727 | A1 | 10/2009 | Hughes | |
| 2010/0082601 | A1 * | 4/2010 | Ramesh et al. | 707/714 |
| 2010/0324990 | A1 * | 12/2010 | D'Angelo et al. | 705/14.46 |
| 2011/0238703 | A1 * | 9/2011 | Porter | 707/792 |
| 2011/0320419 | A1 * | 12/2011 | Johnston et al. | 707/703 |

* cited by examiner

*Primary Examiner* — Kimberly Wilson
(74) *Attorney, Agent, or Firm* — Holland & Knight LLP; Brian J. Colandreo, Esq.; Jeffrey T. Placker, Esq.

(57) ABSTRACT

A computer-implemented method, computer program product, and computing system for implementing multi-temporal tables in a database is described. One or more databases are utilized, wherein the one or more databases implement a first temporal table that includes a first and a second time domain. The one or more databases are enabled to implement a second temporal table that includes at least a third time domain, wherein the second temporal table is associated with the first temporal table.

18 Claims, 5 Drawing Sheets

SYSTEM AND METHOD FOR IMPLEMENTING MULTI-TEMPORAL DATABASE FUNCTIONALITY

TECHNICAL FIELD

This disclosure relates to temporal databases and, more particularly, to a system and method of implementing multiple time domains within databases employing bi-temporal tables.

BACKGROUND

Conventional temporal database systems generally allow users to store data that may be associated with up to two temporal domains. Typically, these systems may provide users with the ability to, e.g., manage data based upon the system time associated with the data and/or a business time associated with the data. Often, users of such conventional temporal database systems may desire to employ additional temporal domains with their data. Implementing such additional temporal domains, however, may not be possible for efficiency and cost reasons. This may lead to a condition where users decide to forgo such enhanced functionality. It may often be useful for a multi-temporal system to be effectively integrated into conventional database systems.

SUMMARY OF DISCLOSURE

According to a first implementation, a computer-implemented method includes utilizing, by a computing device, one or more databases, wherein the one or more databases implement a first temporal table that includes a first and a second time domain. The computing device enables the one or more databases to implement a second temporal table that includes at least a third time domain, wherein the second temporal table is associated with the first temporal table.

One or more of the following features may be included. At least the first temporal table may include one or more tuples of data, wherein the one or more tuples of data may be uniquely identified by a tuple identifier. The one or more tuples of data from the first temporal table may be copied, at least in part, to the second temporal table. The one or more tuples of data of the first temporal table may be linked to the one or more tuples of data of the second temporal table based, at least in part, upon the tuple identifier. The first time domain may define a valid time, and the second time domain may define a system time. The third time domain may define a visibility time.

Further, the one or more tuples of data may be selected based, at least in part, upon one or more of the first, second, and third time domain. The one or more tuples of data may be inserted into one or more of the first and second temporal table. The one or more tuples of data within one or more of the first and second temporal table may be updated. The one or more tuples of data may be ordered based, at least in part, upon selecting only the one or more tuples of data that may be active as of a start of the third time domain.

According to another implementation, a computer program product includes a computer readable medium having a plurality of instructions stored on it. When executed by a processor, the instructions cause the processor to perform operations including utilizing, by a computing device, one or more databases, wherein the one or more databases implement a first temporal table that includes a first and a second time domain. The computing device enables the one or more databases to implement a second temporal table that includes at least a third time domain, wherein the second temporal table is associated with the first temporal table.

One or more of the following features may be included. At least the first temporal table may include one or more tuples of data, wherein the one or more tuples of data may be uniquely identified by a tuple identifier. The one or more tuples of data from the first temporal table may be copied, at least in part, to the second temporal table. The one or more tuples of data of the first temporal table may be linked to the one or more tuples of data of the second temporal table based, at least in part, upon the tuple identifier. The first time domain may define a valid time, and the second time domain may define a system time. The third time domain may define a visibility time.

Further, the one or more tuples of data may be selected based, at least in part, upon one or more of the first, second, and third time domain. The one or more tuples of data may be inserted into one or more of the first and second temporal table. The one or more tuples of data within one or more of the first and second temporal table may be updated. The one or more tuples of data may be ordered based, at least in part, upon selecting only the one or more tuples of data that may be active as of a start of the third time domain.

According to yet another implementation, a computing system includes a processor and a memory module coupled with the processor. A first software module is executable by the processor and the memory module. The first software module is configured to utilize one or more databases, wherein the one or more databases implement a first temporal table that includes a first and a second time domain. A second software module is executable by the processor and the memory module. The second software module is configured to enable the one or more databases to implement a second temporal table that includes at least a third time domain, wherein the second temporal table is associated with the first temporal table.

One or more of the following features may be included. At least the first temporal table may include one or more tuples of data, wherein the one or more tuples of data may be uniquely identified by a tuple identifier. The second software module configured to enable the one or more databases to implement the second temporal table may be further configured to copy, at least in part, the one or more tuples of data from the first temporal table to the second temporal table. Additionally, the second software module configured to enable the one or more databases to implement the second temporal table may also be configured to link the one or more tuples of data of the first temporal table to the one or more tuples of data of the second temporal table based, at least in part, upon the tuple identifier. The first time domain may define a valid time, and the second time domain may define a system time. The third time domain may define a visibility time.

A third software module may be executable by the processor and the memory module. The third software module may be configured to select the one or more tuples of data based, at least in part, upon one or more of the first, second, and third time domain. A fourth software module may be executable by the processor and the memory module. The fourth software module may be configured to insert the one or more tuples of data into one or more of the first and second temporal table. A fifth software module may be executable by the processor and the memory module. The fifth software module may be configured to update the one or more tuples of data within one or more of the first and second temporal table.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
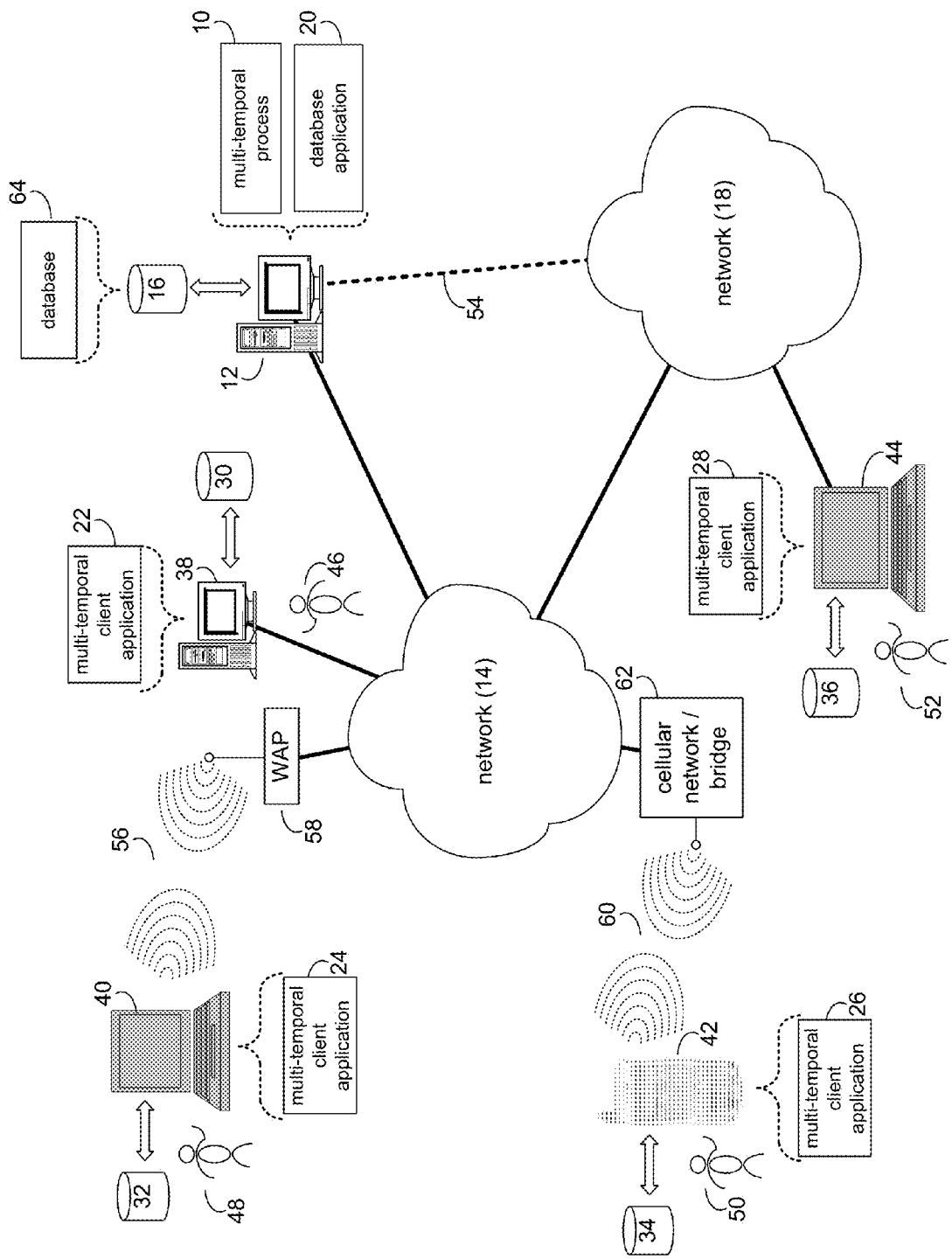
FIG. 1 diagrammatically depicts a multi-temporal process coupled to a distributed computing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown multi-temporal process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a database server (or a series of servers) running a network operating system, examples of which may include but are not limited to: Microsoft® Windows® Server; Novell® NetWare® or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the arrival time process may reside on and be executed, in whole or in part, by a client electronic device, such as a personal computer, notebook computer, personal digital assistant, or the like.

As will be discussed below in greater detail, multi-temporal process 10 may utilize one or more databases, wherein the one or more databases may implement a first temporal table that may include a first and a second time domain. Multi-temporal process 10 may enable the one or more databases to implement a second temporal table that may include at least a third time domain, wherein the second temporal table may be associated with the first temporal table.

The instruction sets and subroutines of multi-temporal process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

For the purpose of the following description, server computer 12 may be discussed. However, this is for illustrative purposes only and should not be construed as a limitation of the present disclosure, as one of skill in the art will appreciate that any computing device capable of performing the functions of multi-temporal process 10 may be utilized.

Server computer 12 may also execute a database management system (e.g., database application 20) that, e.g., may be stored on storage device 16, examples of which may include but are not limited to: DB2 from IBM, Oracle DBMS, or SQL Server from Microsoft, that, e.g., control the creation, maintenance, and the use of a database (e.g., database 64) that may be stored on server computer 12 (IBM is a trademark of IBM Corporation in the United States, other countries, or both; Oracle is a registered trademark of Oracle Corporation in the United States, other countries, or both; and Microsoft is a registered trademark of Microsoft Corporation in the United States, other countries, or both). Network 14 may be connected to one or more secondary networks (e.g., network 18), examples of which may include but are not limited to: a local area network; a wide area network; or an intranet, for example.

Multi-temporal process 10 may be a stand alone application, or may be an applet/application/script that may interact with and/or be executed within database application 20. In addition/as an alternative to being a server-side process, the multi-temporal process may be a client-side process (not shown) that may reside on a client electronic device (described below) and may interact with a multi-temporal client application (e.g., one or more of multi-temporal applications 22, 24, 26, 28). Further, the multi-temporal process may be a hybrid server-side/client-side process that may interact with database application 20 and a multi-temporal client application (e.g., one or more of scheduling client applications 22, 24, 26, 28). As such, the multi-temporal process may reside, in whole, or in part, on server computer 12 and/or one or more client electronic devices.

The instruction sets and subroutines of database application 20, which may be stored on storage device 16 (e.g., the database) coupled to server computer 12 may be executed by one or more processors (not shown) and one or more memory modules (not shown) incorporated into server computer 12.

The instruction sets and subroutines of multi-temporal client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using multi-temporal client applications 22, 24, 26, 28, users 46, 48, 50, 52 may, for example, implement multi-temporal tables in a database employing bi-temporal tables.

Users 46, 48, 50, 52 may access multi-temporal process 10 directly through the device on which the client application (e.g., credential store client applications 22, 24, 26, 28) is executed, namely client electronic devices 38, 40, 42, 44, for example. Users 46, 48, 50, 52 may access multi-temporal process 10 directly through network 14 or through secondary network 18. Further, server computer 12 (i.e., the computer that executes credential store process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

For the purpose of the following description, multi-temporal client application 22 may be discussed. However, this is for illustrative purposes only and should not be construed as a limitation of the present disclosure, as other client applications (e.g., multi-temporal client applications 24, 26, 28) may be equally utilized.

Figure 2:
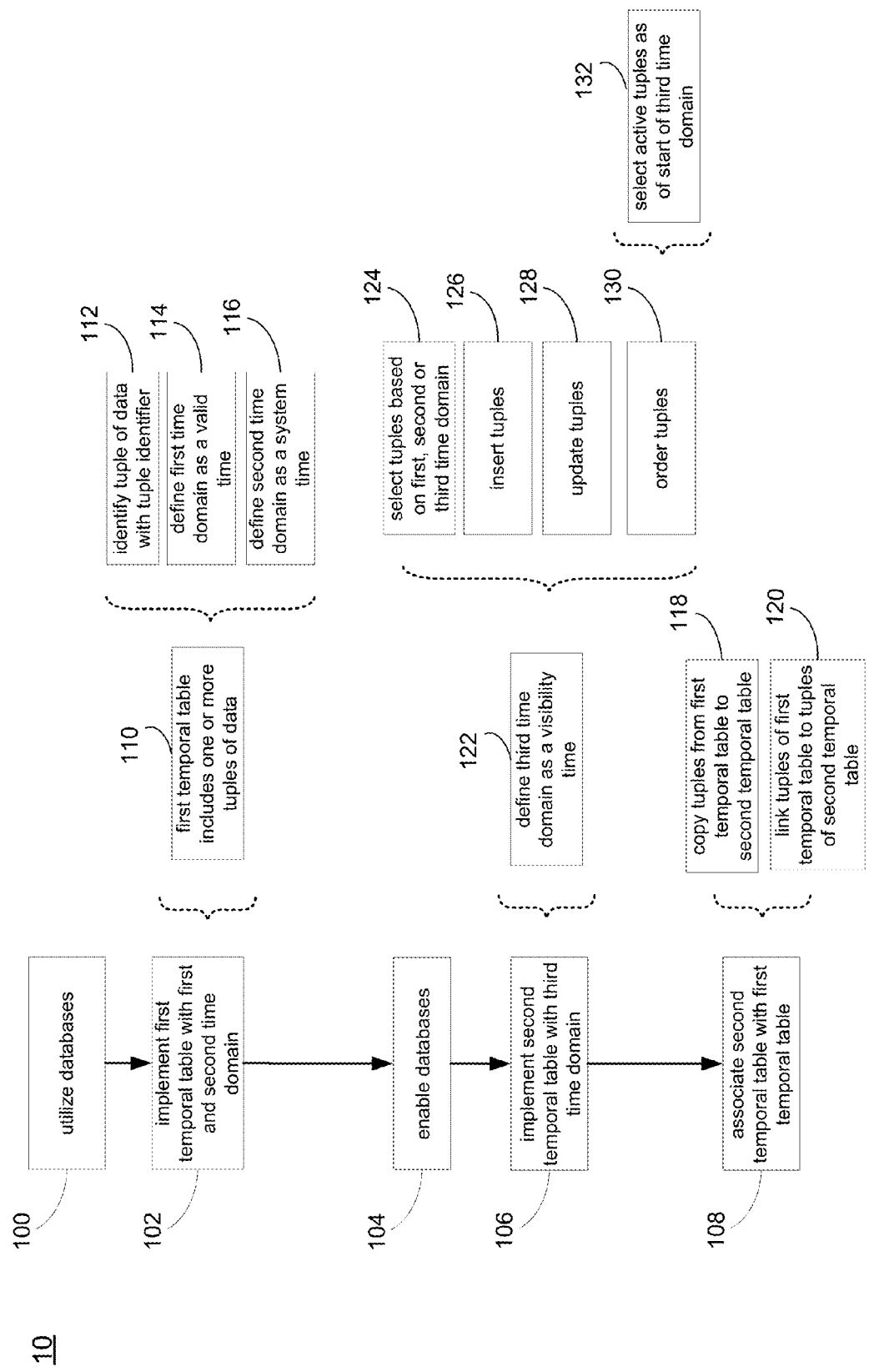
FIG. 2 is a flow chart of a process performed by the multi-temporal process of FIG. 1.

Referring also to FIG. 2, multi-temporal process 10 may utilize 100 (via, e.g., server computer 12) one or more databases, wherein the one or more databases may implement 102 a first temporal table that includes a first and a second time domain. Multi-temporal process 10 may also enable 104 the one or more databases to implement 106 a second temporal table that includes at least a third time domain, wherein the second temporal table is associated 108 with the first temporal table. As used herein, utilizing 100 and/or enabling 104 database(s) (e.g., stored in storage device 16) may involve the use of server computer 12, database application 20, or both. Further, a database that provides temporal tables may mean that it may have built-in time aspects. Specifically, for example, such built-in support may manage temporal data such that it may reduce application logic and may ensure consistent handling of time-related events across applications.

Figure 3:
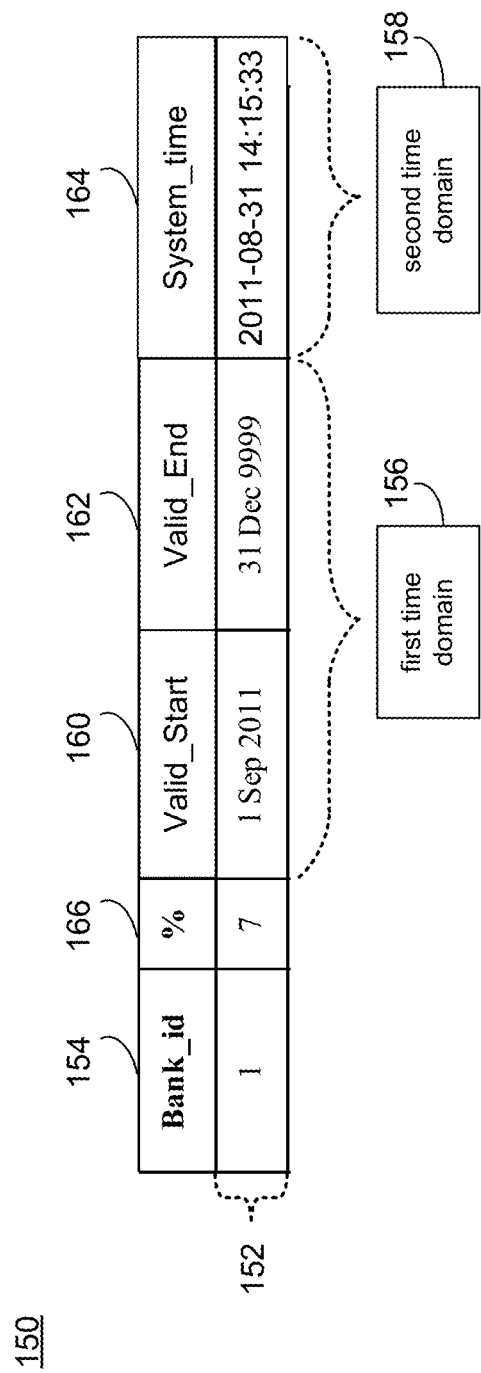
FIG. 3 diagrammatically depicts a temporal domain that may be utilized by the multi-temporal process of FIG. 1.

To further illustrate this concept, and referring also to FIG. 3, an exemplary temporal table (e.g., first temporal table 150) may be shown. At least first temporal table 150 may include 110 one or more tuples of data (e.g., tuple 152), wherein the one or more tuples of data may be uniquely identified 112 by a tuple identifier (described below). In this example of an illustrative banking transaction, however, tuple 152 may include a bank identifier (e.g., "1") that may uniquely identify 112 one or more tuples of data corresponding to a given bank (e.g., "1").

Additionally, multi-temporal process 10 may utilize 100 one or more databases (e.g., database 64), wherein the one or more databases may implement 102 a first temporal table (e.g., first temporal table 150) that may include a first and a second time domain (e.g., first time domain 156 and second time domain 158). Moreover, the first time domain (e.g., first time domain 156) may define 114 a valid time (including, e.g., valid start 160 and valid end 162), and the second time domain (e.g., second time domain 158) may define 116 a system time (e.g., system time 164).

Thus, continuing with the above-stated banking example, a temporal table (e.g., first temporal table 150) implementing 102 a first and second time domain (e.g., first time domain 156 and second time domain 158) may result in tuple 152 including other pieces of data relevant to the banking transaction, which may include, but are not limited to, a banking interest rate (e.g., interest rate 166).

Accordingly, and as will be appreciated by one of skill in the art, certain users of such a system (e.g., banking institutions) may have business needs requiring their data be associated with more than one time domain. Specifically, in the example above, a banking institution may wish to track, publish, etc., the interest rates for which it offers its customers. However, that banking institution may wish to assign a given interest rate (e.g., interest rate 166) to a particular period of time (e.g., first time domain 156), which may not begin on the date and time on which the banking institution entered interest rate 166 into first temporal table 150. In other words, for example, without first time domain 156 (e.g., valid date 160 and valid date 162), the banking institution may be limited to the interest rate becoming effective as of system time 164 (e.g., second time domain 158), which may automatically be set by a database management system (e.g., database application 20).

More specifically, in this particular example, assume the banking institution identified by bank identifier 154 as "1" may have entered a change to interest rate 166 (i.e., 7%) into tuple 152. Moreover, assume this change may have been entered on Aug. 31, 2011 at 2:15 pm, as denoted by system time 164. However, assume that this banking institution did not want the interest rate to go into effect (i.e., become valid) until the next day, Sep. 1, 2011. Accordingly, e.g., valid start 160 and valid end 162 of first time domain 156 may enable the banking institution to provide a valid time period (e.g., first time domain 156) that may be other than the time period in which the interest rate change was entered into the system (e.g., second time domain 158).

One of skill in the art will appreciate that the number, nature, and organization of first time domain 156, second time domain 158, tuple identifier 154, and interest rate 166 within first temporal table 150 may vary depending on programming/design requirements. As such, first time domain 156, second time domain 158, tuple identifier 154, and interest rate 166 are merely illustrative and are not intended to impart any limitation on the number or nature of elements to a given tuple (e.g., tuple 152) or temporal table (e.g., first temporal table 150). Moreover, the dissection of time domains is not intended to be a limitation of this disclosure. For example, and akin to first time domain 156, while second time domain 158 may only be illustrated with a single time (e.g., system time 164), second time domain 158 may also embody, e.g., an end time for, e.g., describing the time in which a given tuple was modified.

Figure 4:
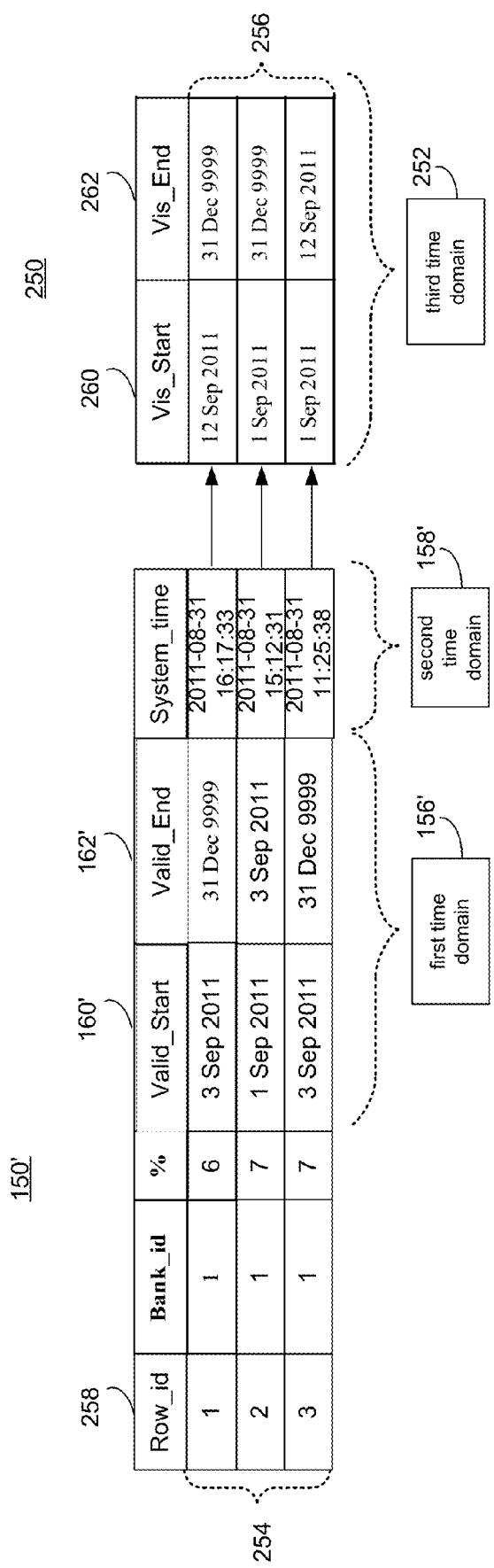
FIG. 4 diagrammatically depicts a temporal domain that may be utilized by the multi-temporal process of FIG. 1.

Referring to FIG. 4, multi-temporal process 10 may enable 104 the one or more databases (e.g., database 64) to implement 106 a second temporal table (e.g., second temporal table 250) that includes at least a third time domain (e.g., third time domain 252), wherein the second temporal table is associated 108 with the first temporal table (e.g., first temporal table 150').

Keeping with the spirit of the above recited example regarding banking institutions (although describing a modified version of first temporal table 150 as first temporal table 150'), such users may additionally wish to maintain a third time domain (e.g., third time domain 252) relative to their data (e.g., interest rate changes). One illustrative reason for doing so may be to "mask" or "hide" a change to an interest rate, even though the interest rate change may have been entered into the database (e.g., database 64).

Accordingly, the third time domain (e.g., third time domain 252) may define 122 a visibility time (e.g., including visibility start 260 and visibility end 262). As one of skill in the art will appreciate, the range provided by visibility start 260 and visibility end 260 of multi-temporal process 10 may enable a user to define a time period within which a given tuple of data may be visible (e.g., a given interest rate change), such that the data may be entered into a database (e.g., database 64) prior to its presence being publicized.

In doing so, the one or more tuples of data (e.g., tuples 254) from the first temporal table (e.g., first temporal table 150') may be copied 118, at least in part, to the second temporal table (e.g., second temporal table 250). Moreover, the one or more tuples of data (e.g. tuples 254) of the first temporal table may be linked 120 to the one or more tuples of data (e.g., tuples 256) of the second temporal table based, at least in part, upon the tuple identifier (e.g., tuple identifier 258).

To accomplish such, and as a representative example only, the following may be an illustrative SQL statement that may be employed to implement a first temporal table (e.g., first temporal table 150'):

```
CREATE TABLE RATETABLE_BUS (
    ROW_ID        INT NOT NULL,
    BANKID        INT NOT NULL,
    RATE          VARCHAR(4) NOT NULL,
    VALID_START   DATE NOT NULL,
    VALID_END     DATE NOT NULL,
    EVIS_START    DATE NOT NULL,
    EVIS_END      DATE NOT NULL,
    EXE_START     TIMESTAMP(12) GENERATED ALWAYS AS
                  ROW BEGIN NOT NULL,
```

-continued

```
    EXE_END        TIMESTAMP(12) GENERATED ALWAYS AS
                   ROW END NOT NULL,
    TRANS_START    TIMESTAMP(12) GENERATED ALWAYS AS
                   TRANSACTION START ID
                   IMPLICITLY HIDDEN,
    PERIOD SYSTEM_TIME (EXE_START, EXE_END),
    PERIOD BUSINESS_TIME (VALID_START, VALID_END),
    PRIMARY KEY (ROW_ID)
)
```

Similarly, and as a representative example only, the following may be an illustrative SQL statement that may be employed to implement a second temporal table (e.g., second temporal table 250):

```
CREATE TABLE RATETABLE_VIS (
    ROW_ID         INT NOT NULL,
    VIS_START      DATE NOT NULL,
    VIS_END        DATE NOT NULL,
    VEXE_START     TIMESTAMP(12) GENERATED ALWAYS AS
                   ROW BEGIN NOT NULL IMPLICITLY
                   HIDDEN,
    VEXE_END       TIMESTAMP(12) GENERATED ALWAYS AS
                   ROW END NOT NULL IMPLICITLY
                   HIDDEN,
    TRANS_START    TIMESTAMP(12) GENERATED ALWAYS AS
                   TRANSACTION START ID IMPLICITLY
                   HIDDEN,
    PERIOD SYSTEM_TIME (VEXE_START, VEXE_END),
    PERIOD BUSINESS_TIME(VIS_START, VIS_END),
    PRIMARY KEY(ROW_ID),
    CONSTRAINT RATETABLE_VIS_ROWID_FK FOREIGN KEY
    (ROW_ID)
                   REFERENCES RATETABLE_BUS (ROW_ID)
                   ON DELETE CASCADE
)
```

As one of skill in the art will appreciate, the above exemplary SQL statements may demonstrate that second temporal table 250 (e.g., RATETABLE_VIS) may be linked 120 to first temporal table 150' (e.g., RATETABLE_BUS) by virtue of, e.g., a primary-foreign key relation based, at least in part, upon the tuple identifier (e.g., tuple identifier 258).

Thus, multi-temporal process 10 may enable 104, e.g., database 64 to implement 106 a second temporal table (e.g., second temporal table 250) that includes third time domain 252. Further, second temporal table 250 may be associated 108 with first temporal table 150' based, at least in part, upon tuple identifier 258.

One of skill in the art will appreciate that the number, nature, and organization of first temporal table 150' and second temporal table 250 may vary depending on programming/design requirements. As such, first temporal table 150' and second temporal table 250 are merely illustrative and are not intended to impart any limitation on the number or nature of temporal tables that may be implemented. Moreover, one of skill in the art will appreciate that additional temporal tables may be implemented to, e.g., provide additional time domains.

Illustratively, and continuing with the above-stated banking example, a user (e.g., banking institution) may wish to implement further time-based functionality in addition to, e.g., a visibility time (e.g., visibility start 260 and visibility end 262, discussed hereinbelow). In such an instance, multi-temporal process 10 may be used to, e.g., implement a third temporal table (not shown) that may enable the banking institution to further refine time-based functionality by providing for, e.g., a fourth time domain (not shown).

Stated in exemplary mathematical terms, this non-limited additional temporal functionality (i.e., "m") may be interpreted as increasing the number of functional time domains from, e.g., 2 to an infinitely greater number, depending on a user's needs:

n-timedomains (where, e.g., n>=2) to n+m (where m>0).

Additionally, one of skill in the art will also appreciate that the implementation of additional time domains via, e.g., multiple temporal tables may not be the only means by which such implementation may be achieved. For example, multi-temporal process 10 may utilize a single temporal table (e.g., first temporal table 150') in conjunction with, e.g., multiple time-based columns (e.g., SQL DATE columns), as well as any necessary logic for, e.g., ensuring that data integrity and/or overlap may be properly implemented for each additional time domain.

To accomplish such, and as a representative example only, the following may be an illustrative SQL statement that may be employed to implement multiple time domains using a single temporal table (not shown):

```
CREATE TABLE RATETABLE (
    BANKID         INT NOT NULL,
    RATE           VARCHAR(4) NOT NULL,
    EFF_START      DATE NOT NULL,
    EFF_END        DATE NOT NULL,
    VIS_START      DATE NOT NULL,
    VIS_END        DATE NOT NULL,
    EXE_START      TIMESTAMP(12) GENERATED ALWAYS
                   AS ROW BEGIN NOT NULL,
    EXE_END        TIMESTAMP(12) GENERATED ALWAYS
                   AS ROW END NOT NULL,
    TRANS_START    TIMESTAMP(12) GENERATED ALWAYS
                   AS TRANSACTION START ID
                   IMPLICITLY HIDDEN,
    PERIOD         SYSTEM_TIME (EXE_START, EXE_END),
    PERIOD         BUSINESS_TIME(EFF_START, EFF_END)
)
```

Accordingly, and continuing with the above-described banking example, if, at 10:00 am on 9 Sep. 2011, a banking institution implementing a single temporal table solution wished to change the interest rate from 7% to 6% with an effective date of 3 Sep. 2011—but, e.g., only wished such change to be visible from 12 Sep. 2011—it may employ the following illustrative SQL statement:

```
UPDATE RATETABLE
           FOR PORTION OF BUSINESS_TIME FROM '2011-09-03'
           TO '9999-12-31'
    SET    RATE = '6', VIS_START = '2011-09-12', VIS_END =
           '9999-12-31'
    WHERE  BANKID = '1' AND
           T_OVERLAPS('2011-09-12','2011-09-13',VIS_START,
           VIS_END)=1
```

This is not intended to impart any limitation on this disclosure, however. One of skill in the art will appreciate that many other means of implementing such functionality may be employed.

Moreover, and continuing with the above-stated banking example, third time domain 252 of second temporal table 250 may include visibility start 260 and visibility end 262 such that a given tuple (e.g., one or more of tuples 254) may not be publicized outside of third time domain 252.

Additionally, the one or more tuples of data (e.g., tuples 254/256) may be ordered 130 based, at least in part, upon selecting 132 only the one or more tuples of data that may be active as of a start of the third time domain (e.g., third time domain 252).

For example, and continuing with the above-stated banking example, the updating 128 of one or more tuples of data (e.g., tuples 254) may require a notion of transaction ordering to determine what data will be affected. As a consequence of associating 108 multiple time domains (e.g., first time domain 156', second time domain 158', and third time domain 252) with tuples 254, the portion of tuples 254 that may be affected may be determined on any of the multiple time domains (e.g., first time domain 156', second time domain 158', and third time domain 252).

Figure 5:
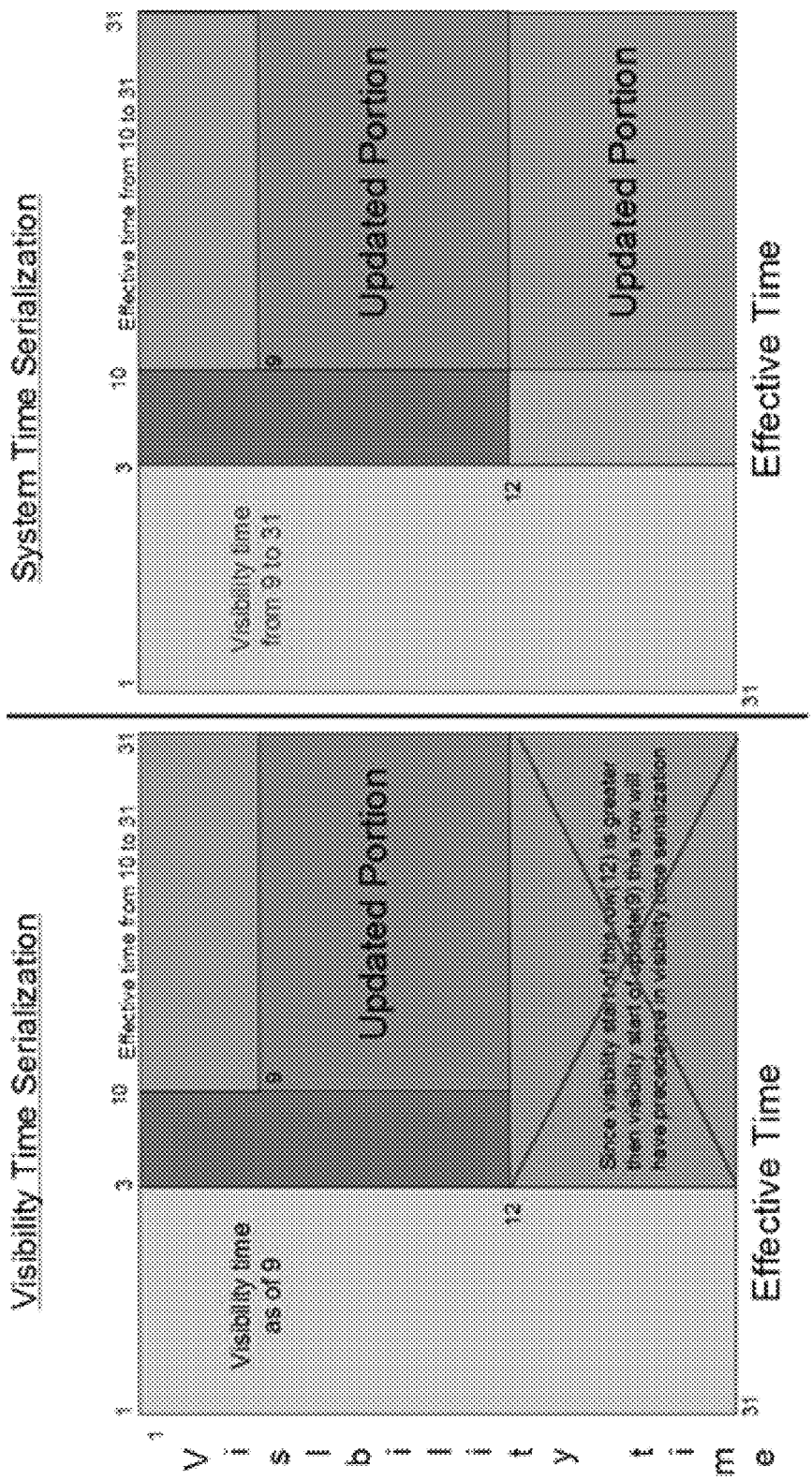
FIG. 5 diagrammatically depicts the effects of ordering based, at least in part, upon various temporal domains that may be utilized by the multi-temporal process of FIG. 1.

Referring also to FIG. 5, there may be shown a consequence of ordering 130 of one or more tuples of data (tuples 254) by multi-temporal process 10 when a user may choose to select 132, e.g., tuples 254 based upon, e.g., third time domain 252 (on left) and second time domain 158' (on right).

Specifically, the left part of the figure may depict the portion of data that may be updated based upon two illustrative update scenarios. For example, assume for the first update that the date is 9 Sep. 2011, and the time is 10:00 am. There, the banking institution lowered the interest rate from 7% to 6%, with the change in interest rate being valid as of 3 Sep. 2011, and visible as of 12 Sep. 2011. Additionally, for example, assume for the second update that the date remains 9 Sep. 2011, yet the time is now 11:00 am. There, the banking institution lowered the interest rate to 5%, with the change in interest rate being effective from 10 Sep. 2011, and immediately visible.

As one of skill in the art will recognize, the leftmost chart may depict the consequence of updating 128 of the temporal tables (e.g., first temporal table 150' and second temporal table 250) by multi-temporal process 10 if the updates may be ordered 130 employing, e.g., third time domain 252. In contrast, the rightmost chart may depict the consequence of updating 128 of the temporal tables (e.g., first temporal table 150' and second temporal table 250) by multi-temporal process 10 if the updates may be ordered 130 employing, e.g., second time domain 158'.

This is not intended to be construed as a limitation of this disclosure, however. One of skill in the art will appreciate that any number of other methods may be employed to order tuples of data within one or more temporal tables (e.g., first temporal table 150' and second temporal table 250).

Continuing with the above-stated example, the one or more tuples of data (e.g., tuples 254) may be selected 124 based, at least in part, upon one or more of the first, second, and third time domain (e.g., first time domain 156', second time domain 158', and third time domain 252). For illustrative purposes only, and as is known in the art, a SELECT statement may allow data to be retrieved and a user may be able to specify what data should be retrieved using predicates. For example, some databases may support, e.g., a BUSINESS_TIME clause to specify data along the BUSINESS_TIME domain (e.g., the range of valid start 160' to valid start 162').

However, upon implementing an additional time domain (e.g., third time domain 252), this support may need to be extended to permit users to specify the desired domain. As an exemplary solution, multi-temporal process 10 may, e.g., implement native SQL syntax in the following manner:

```
SELECT *
FROM RT_BUS
    FOR BUSINESS_TIME 1 FROM '2010/01/01' TO '9999/12/31'
    FOR BUSINESS_TIME 2 FROM <vis_start> TO <vis_end>
```

This is not intended to be construed as a limitation of this disclosure, however. One of skill in the art will appreciate that any number of other methods may be employed to specify tuples in additional domains. For example, multi-temporal process 10 may implement a predicate generated within a stored procedure interface.

The one or more tuples of data (e.g., tuples 254) may be inserted 126 into one or more of the first and second temporal table (e.g., first temporal table 150' and second temporal table 250). For illustrative purposes only, and as is known in the art, additional time periods may be considered a normal DATE column, so no additional support may necessary to provide support for inserting 126 tuples (e.g., tuples 254) into such.

Continuing with the above stated example, multi-temporal process 10 may, e.g., implement the following native SQL syntax to achieve this functionality:

```
INSERT INTO RATETABLE_BUS(BANKID, RATE, VAL_START, VAL_END,
    VIS_START, VIS_END)
VALUES (1, '7', '2010-09-01', '9999-12-31', '2010-09-01',
'9999-12-31')
```

This is not intended to be construed as a limitation of this disclosure, however. One of skill in the art will appreciate that any number of other methods may be employed to insert tuples of data into one or more temporal tables (e.g., first temporal table 150' and second temporal table 250).

The one or more tuples of data (e.g., tuples 254) within one or more of the first and second temporal table (e.g., first temporal table 150' and second temporal table 250) may be updated 128. For illustrative purposes only, and as is known in the art, an UPDATE statement may be specified as part of the above-mentioned BUSINESS_TIME clause (e.g., for the range of valid start 160' to valid start 162'), which may determine the data to be updated.

However, upon implementing an additional time domain (e.g., third time domain 252), this support may need to be extended to permit users to specify the desired domain. As an exemplary solution, multi-temporal process 10 may, e.g., implement native SQL syntax in the following manner:

```
UPDATE RATETABLE_BUS
            FOR PORTION OF BUSINESS_TIME 1
                FROM '2011-9-3' TO '9999-12-31'
            FOR PORTION OF BUSINESS_TIME 2
                AS OF <vis_start>
    SET         RATE = <new_rate>
    WHERE       BANKID = B_ID
```

This is not intended to be construed as a limitation of this disclosure, however. One of skill in the art will appreciate that any number of other methods may be employed to update 128 one or more tuples of data (e.g., tuples 254). For example, multi-temporal process 10 may generate a predicate within a stored procedure interface.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:
   utilizing, by a computing device, one or more databases, wherein the one or more databases implement a first temporal table that includes a first and a second time domain; and
   enabling, by the computing device, the one or more databases to implement a second temporal table that includes at least a third time domain, wherein the second temporal table is associated with the first temporal table, wherein the third time domain defines a visibility time, wherein data is entered into the one or more databases prior to the data being publicized, wherein at least the first temporal tables includes one or more tuples of data; and
   upon implementing the second temporal table, ordering the one or more tuples of data based, at least in part, upon selecting only the one or more tuples of data that are active as of a start of the third time domain.

2. The computer-implemented method of claim 1 wherein the one or more tuples of data are uniquely identified by a tuple identifier.

3. The computer-implemented method of claim 2 wherein enabling the one or more databases to implement the second temporal table further comprises:
   copying, at least in part, the one or more tuples of data from the first temporal table to the second temporal table; and
   linking the one or more tuples of data of the first temporal table to the one or more tuples of data of the second temporal table based, at least in part, upon the tuple identifier.

4. The computer-implemented method of claim 3 further comprising one or more of:
   selecting the one or more tuples of data to copy based, at least in part, upon one or more of the first, second, and third time domain;
   inserting the one or more tuples of data into one or more the first and second temporal table; and
   updating the one or more tuples of data within one or more of the first and second temporal table.

5. The computer-implemented method of claim 1 wherein:
   the first time domain defines a valid time; and
   the second time domain defines a system time.

6. The computer-implemented method of claim 1 further comprising:
   enabling, by the computing device, the one or more databases to implement a third temporal table that includes at least a fourth time domain, wherein the third temporal table is associated with at least one of the first and second temporal tables.

7. A computer program product residing on a non-transitory computer readable medium having a plurality of instructions stored thereon which, when executed by a processor, cause the processor to perform operations comprising:
   utilizing one or more databases, wherein the one or more databases implement a first temporal table that includes a first and a second time domain; and
   enabling the one or more databases to implement a second temporal table that includes at least a third time domain, wherein the second temporal table is associated with the first temporal table, wherein the third time domain defines a visibility time, wherein data is entered into the one or more databases prior to the data being publicized, wherein at least the first temporal tables includes one or more tuples of data; and
   upon implementing the second temporal table, ordering the one or more tuples of data based, at least in part, upon selecting only the one or more tuples of data that are active as of a start of the third time domain.

8. The computer program product of claim 7 wherein the one or more tuples of data are uniquely identified by a tuple identifier.

9. The computer program product of claim 8 wherein enabling the one or more databases to implement the second temporal table further comprises:
   copying, at least in part, the one or more tuples of data from the first temporal table to the second temporal table; and
   linking the one or more tuples of data of the first temporal table to the one or more tuples of data of the second temporal table based, at least in part, upon the tuple identifier.

10. The computer program product of claim 9 further comprising one or more of:
    selecting the one or more tuples of data to copy based, at least in part, upon one or more of the first, second, and third time domain;
    inserting the one or more tuples of data into one or more of the first and second temporal table; and
    updating the one or more tuples of data within one or more of the first and second temporal table.

11. The computer program product of claim 7 wherein:
    the first time domain defines a valid time; and
    the second time domain defines a system time.

12. The computer program product of claim 7 further comprising:
enabling the one or more databases to implement a third temporal table that includes at least a fourth time domain, wherein the third temporal table is associated with at least one of the first and second temporal tables.

13. A computing system comprising:
a processor, wherein the processor is hardware;
a memory module coupled with the processor;
a first software module executable by the processor and the memory module, wherein the first software module is configured to utilize one or more databases, wherein the one or more databases implement a first temporal table that includes a first and a second time domain; and
a second software module executable by the processor and the memory module, wherein the second software module is configured to enable the one or more databases to implement a second temporal table that includes at least a third time domain, wherein the second temporal table is associated with the first temporal table, wherein the third time domain defines a visibility time, wherein data is entered into the one or more databases prior to the data being publicized, wherein at least the first temporal tables includes one or more tuples of data; and
a third software module executable by the processor and the memory module, wherein the third software module is configured to, upon implementing the second temporal table, order the one or more tuples of data based, at least in part, upon selecting only the one or more tuples of data that are active as of a start of the third time domain.

14. The computing system of claim 13 wherein the one or more tuples of data are uniquely identified by a tuple identifier.

15. The computing system of claim 14 wherein the second software module configured to enable the one or more databases to implement the second temporal table is further configured to:
copy, at least in part, the one or more tuples of data from the first temporal table to the second temporal table; and
link the one or more tuples of data of the first temporal table to the one or more tuples of data of the second temporal table based, at least in part, upon the tuple identifier.

16. The computing system of claim 15 further comprising one or more of:
a fourth software module executable by the processor and the memory module, wherein the fourth software module is configured to select the one or more tuples of data to copy based, at least in part, upon one or more of the first, second, and third time domain;
a fifth software module executable by the processor and the memory module, wherein the fifth software module is configured to insert the one or more tuples of data into one or more of the first and second temporal table; and
a sixth software module executable by the processor and the memory module, wherein the sixth software module is configured to update the one or more tuples of data within one or more of the first and second temporal table.

17. The computing system of claim 15 further comprising:
a seventh software module executable by the processor and the memory module, wherein the seventh software module is configured to enable the one or more databases to implement a third temporal table that includes at least a fourth time domain, wherein the third temporal table is associated with at least one of the first and second temporal tables.

18. The computing system of claim 13 wherein:
the first time domain defines a valid time; and
the second time domain defines a system time.

* * * * *